(12) United States Patent
Henderson et al.

(10) Patent No.: US 11,702,054 B2
(45) Date of Patent: Jul. 18, 2023

(54) REDUNDANT BRAKING UNIT FOR A BRAKING SYSTEM AND SYSTEM USING SAME

(71) Applicant: Volvo Truck Corporation, Gothenburg (SE)

(72) Inventors: Leon Henderson, Gothenburg (SE); Christian Oscarsson, Stenungsund (SE); Leo Laine, Härryda (SE)

(73) Assignee: Volvo Truck Corporation, Gothenburg (SE)

( * ) Notice: Subject to any disclaimer, the term of this patent is extended or adjusted under 35 U.S.C. 154(b) by 386 days.

(21) Appl. No.: 17/051,969

(22) PCT Filed: May 3, 2018

(86) PCT No.: PCT/EP2018/061374
§ 371 (c)(1),
(2) Date: Oct. 30, 2020

(87) PCT Pub. No.: WO2019/210960
PCT Pub. Date: Nov. 7, 2019

(65) Prior Publication Data
US 2021/0237703 A1 Aug. 5, 2021

(51) Int. Cl.
*B60T 13/68* (2006.01)
*B60T 13/66* (2006.01)
(Continued)

(52) U.S. Cl.
CPC .......... *B60T 13/683* (2013.01); *B60T 13/662* (2013.01); *B60T 8/1708* (2013.01); *B60T 8/327* (2013.01);
(Continued)

(58) Field of Classification Search
CPC .... B60T 13/683; B60T 8/1708; B60T 13/662; B60T 8/327; B60T 2270/413; B60Y 2400/81
See application file for complete search history.

(56) References Cited

U.S. PATENT DOCUMENTS

| 2003/0192751 A1 | 10/2003 | Costa | |
|---|---|---|---|
| 2007/0170774 A1* | 7/2007 | Gerum | B60T 13/66 188/140 R |
| 2021/0078556 A1* | 3/2021 | Laine | B60T 17/221 |

FOREIGN PATENT DOCUMENTS

| DE | 4309467 A1 | 9/1994 |
|---|---|---|
| EP | 2794368 A1 | 10/2014 |

(Continued)

OTHER PUBLICATIONS

International Search Report and Written Opinion for PCT/EP2018/061374, dated Mar. 14, 2019, 9 pages.

*Primary Examiner* — Pamela Rodriguez
(74) *Attorney, Agent, or Firm* — Withrow & Terranova, PLLC

(57) ABSTRACT

A brake control device (10) for delivering air under controlled pressure to a pneumatic brake actuator (BA), comprising an inlet port (51) coupled to a compressed air supply circuit, a working port (54) coupled to a service brake chamber (C2) of the brake actuator (BA), a venting port (56), first and second inlet solenoid valves (31, 32) for selectively connecting inlet port(s) to the working port, first and second outlet solenoid valves (41, 42) for selectively connecting the working port to venting port(s), a biased check valve (12), for coupling the working port to venting port(s), the brake control unit device further comprising first and second local electronic control units (21, 22) for controlling independently first and second inlet solenoid valves and first and second outlet solenoid valves.

15 Claims, 5 Drawing Sheets

(51) Int. Cl.
    *B60T 8/17*    (2006.01)
    *B60T 8/32*    (2006.01)
(52) U.S. Cl.
    CPC ..... *B60T 2270/413* (2013.01); *B60Y 2400/81* (2013.01)

(56) References Cited

FOREIGN PATENT DOCUMENTS

| WO | 2017/017617 A1 | 2/2017 |
| WO | 2017/060128 A1 | 4/2017 |

* cited by examiner

REDUNDANT BRAKING UNIT FOR A BRAKING SYSTEM AND SYSTEM USING SAME

This application is a 35 USC 371 national phase filing of International Application No. PCT/EP2018/061374, filed May 3, 2018, the disclosure of which is incorporated herein by reference in its entirety.

FIELD OF THE INVENTION

This invention relates to an electronically controlled pneumatic brake system for an automotive vehicle. This invention also relates to an automotive vehicle equipped with such a system.

BACKGROUND OF THE DISCLOSURE

In the field of automotive vehicles, reliable trajectory control is among the prominent safety features required for ensuring smooth and secure traffic on roads. More particularly, steering and braking function are of utmost importance.

The present disclosure focuses more particularly on the braking function, which relies, in particular for trucks, and more generally for heavy duty vehicles, on an electro-pneumatic system using air under pressure as working fluid.

It has long been made compulsory to provide two independent pneumatic circuits, as a redundant arrangement in order to keep a braking capability in case one circuit undergoes a failure.

Later, solutions using electric control on top of baseline pneumatic system were introduced to speed up pressure changes at axles, so the effective control at brake actuators can reflect driver controls in a more real time fashion.

More recently, a trend to go towards brake-by-wire solutions has lead the trucks designers to simplify the foot pedal brake unit by removing all the pneumatic components from the foot pedal unit, as taught in EP2794368. However, reliability and tolerance to failure(s) must still be ensured, especially in the area of electrical controls and pneumatic controls.

Now, with the outlook of autonomous vehicles and vehicle automation, the inventors have endeavored to find new solutions for providing redundant electro-pneumatic braking systems.

SUMMARY OF THE DISCLOSURE

According to one aspect of the present invention, a brake control device (10) for delivering air under controlled pressure to a pneumatic brake actuator (BA) is disclosed, with a valve assembly (1, 1a, 1b) comprising:
  one or more inlet ports (51, 52) coupled to at least a compressed air supply circuit,
  a working port (54) coupled to a service brake chamber (C2) of the brake actuator (BA),
  one or more venting ports (56) for releasing air to the atmosphere
  a first inlet solenoid valve (31) for connecting one or more inlet ports to the working port, upon selective control,
  a first outlet solenoid valve (41) for connecting the working port to one or more venting ports, upon selective control,
  a second inlet solenoid valve (32) for connecting one or more inlet ports to the working port, upon selective control,
  a second outlet solenoid valve (42) for connecting the working port to one or more venting ports, upon selective control,
  a biased check valve (12), for coupling the working port to one of the venting port(s), the brake control device further comprising:
  a first local electronic control unit (21) for controlling first inlet solenoid valve and first outlet solenoid valve,
  a second local electronic control unit (22) for controlling second inlet solenoid valve and second outlet solenoid valve.

Thanks to this arrangement, it is possible to provide a full electrical control redundancy for the brake control device and likewise for an overall redundant configuration of the braking system when several such brake control devices are used in a complete braking system.

In various embodiments of the invention, one may possibly have recourse in addition to one or more of the following arrangements, taken alone or in combination.

According to one aspect, the first and second local electronic control unit (21, 22) are advantageously caused to control, in a substantially simultaneous fashion, the first and second inlet solenoid valves (31, 32) and to control respectively, in a substantially simultaneous fashion, the first and second outlet solenoid valves (41, 42).

Whereby a full parallel operation is achieved, and whenever a problem occurs at one valve, the braking function is still provided without any time delay required to switch to a backup operation mode.

According to another aspect, the first and second inlet solenoid valves (31, 32) exhibit different pneumatic characteristics. For example, the pneumatic orifice size of one valve can be large and the pneumatic orifice size of the other valve can be smaller. Whereby, coarse and fine pneumatic flow can be combined to result in efficient controllability of the pneumatic flow injected to the working chamber pressure ('controllability' includes actuation time and pressure resolution).

According to another aspect, the first and second outlet solenoid valves (41, 42) exhibit different pneumatic characteristics. For example, the pneumatic orifice size of one valve can be large and the pneumatic orifice size of the other valve can be smaller. Whereby, coarse and fine pneumatic flow can be combined to result in efficient controllability of the pneumatic flow released to the atmosphere from the working chamber ('controllability' includes actuation time and pressure resolution).

According to one aspect, the pneumatic orifice with the smaller size for inlet and outlet valves is chosen to be compliant with the minimum regulatory requirements about secondary or backup braking.

According to another aspect, the two orifices of the first inlet solenoid valve (31) may exhibit a size identical to the size of the two orifices of the second inlet solenoid valve (32) and, the two orifices of the first outlet solenoid valve (41) exhibits a size identical to the size of the two orifices of the second outlet solenoid valve (42). This provides a full balanced tandem configuration.

According to one aspect, the inlet and outlet solenoid valves (31, 32, 41, 42) are normally closed solenoid valves. Whereby, one of the ECUs 21, 22 happen to be unavailable or is unpowered, the corresponding valves (inlet and outlet) remain closed, and the operation of the remaining ECU and its associated valves is not hindered by the part of the circuit which is inoperative. In addition to this, if the valves were open when 'power down' occurs, the valves are switched to the closed state.

According to one aspect, the first and second local electronic control units (21, 22) are supplied from independent electrical power supplies. Thereby, redundancy is achieved regarding electrical power supply; if one supply fails rendering its associated ECU inoperative, the other ECU can still be supplied by the other electrical power supply and remains operative.

According to one aspect, the first and second local electronic control units (21, 22) are provided with data from at least two independent communication buses or from at least two independent control signals. Said otherwise, the first and second local electronic control units (21, 22) are provided with data from at least two independent data channels to locally control the braking function.

Thereby, redundancy is achieved regarding data to control the wheel brake control devices; if one data channel fails rendering its associated ECU inoperative, the other ECU can still be supplied by the other data channel and remains operative.

According to one aspect, the one or more inlet ports are arranged such that there is provided a first inlet port (51) coupled to a first air supply circuit (AC1) and to the first inlet solenoid valve (31) and a second inlet port (52) coupled to a second air supply circuit (AC3) and to the second inlet solenoid valve (32).

Thereby, redundancy is achieved regarding pneumatic supply; if one pneumatic supply fails rendering its associated valves inoperative, the other valves can still be supplied by the other pneumatic supply and remains operative.

According to one aspect, there is provided a first check valve (13) on the first air supply circuit (AC1) upstream the first inlet port (51), and a second check valve (14) on the second air supply circuit (AC3) upstream the second inlet port (52). A loss of pressure in one of the two circuits does not affect the other circuit, which remains fully operative.

According to one aspect, the device may further comprise at least one pressure sensor (91) fluidly coupled to the working port (54). The signals delivered by the pressure sensor, indicative of the working pressure (PW) can be advantageously used by at least one (preferably both) of the local electronic control units (21, 22) to perform a real-time regulation of the working pressure according to a setpoint received from a remote unit.

According to one aspect, the device may further comprise first and second pressure sensors (91, 92), wherein the first and second local electronic control units (21, 22) can respectively perform a diagnostic routine to monitor proper operation of inlet and outlet valves. For example, first pressure sensor (91) can be dedicated to the first local electronic control unit (21) and second pressure sensor (92) can be dedicated to the second local electronic control unit (22), thereby providing independence, thus improving redundancy.

According to one aspect, the device may further comprise wheel speed sensors, preferably two wheel speed sensors (WSSa, WSSb) per braked wheel or pair of twin braked wheels. Whereby, the first and second local electronic control units (21, 22) can respectively perform ABS function, preferably in independent manner thus improving redundancy.

According to one aspect, the device may further comprise a cross communication link (28) between the first and second local electronic control units (21, 22). Thereby, each first and second local electronic control units can monitor the proper operation of its alter ego, for example by checking the reception of "alive and good health" signals. Further, one of first and second local electronic control units can determine therefrom that its alter ego is not operative, and therefore the remaining control unit can change accordingly the control law to control the inlet and outlet valves as sole operative valves.

According to one aspect, the valve assembly can be a single unit (1). This improves integration and reduces overall cost.

According to one aspect, the valve assembly can be made of two separate units (1a, 1b) each with or without its associated local electronic control unit (21; 22) integrated therein. This provides independence and improves overall redundancy.

According to one aspect, the biased check valve (12) biases the check valve toward an open position, with a biasing force corresponding to a difference (PW-Patm) between working pressure and atmospheric pressure below a predetermined threshold (PTH), with preferably the threshold (PTH) chosen between 0 bar and 1 bar, preferably between 0.1 bar and 0.5 bar. Thereby, a small leak from one of inlet valves can be vented to the atmosphere and a possible undesirable small braking friction can be eliminated.

According to one aspect, the biased check valve (12) is a spring loaded check valve. This forms a robust and reliable solution.

The present disclosure is also directed to an electronically controlled pneumatic brake system for an automotive vehicle comprising one or more brake control device(s) as described above.

The present disclosure is also directed to a vehicle comprising an electronically controlled pneumatic brake system as described above.

BRIEF DESCRIPTION OF THE DRAWINGS

Other features and advantages of the invention appear from the following detailed description of two of its embodiments, given by way of non-limiting example, and with reference to the accompanying drawings, in which.

DETAILED DESCRIPTION OF THE DISCLOSURE

In the figures, the same references denote identical or similar elements. Unless stated otherwise, the pneumatic lines are shown thicker than the electrical lines.

Figure 1:
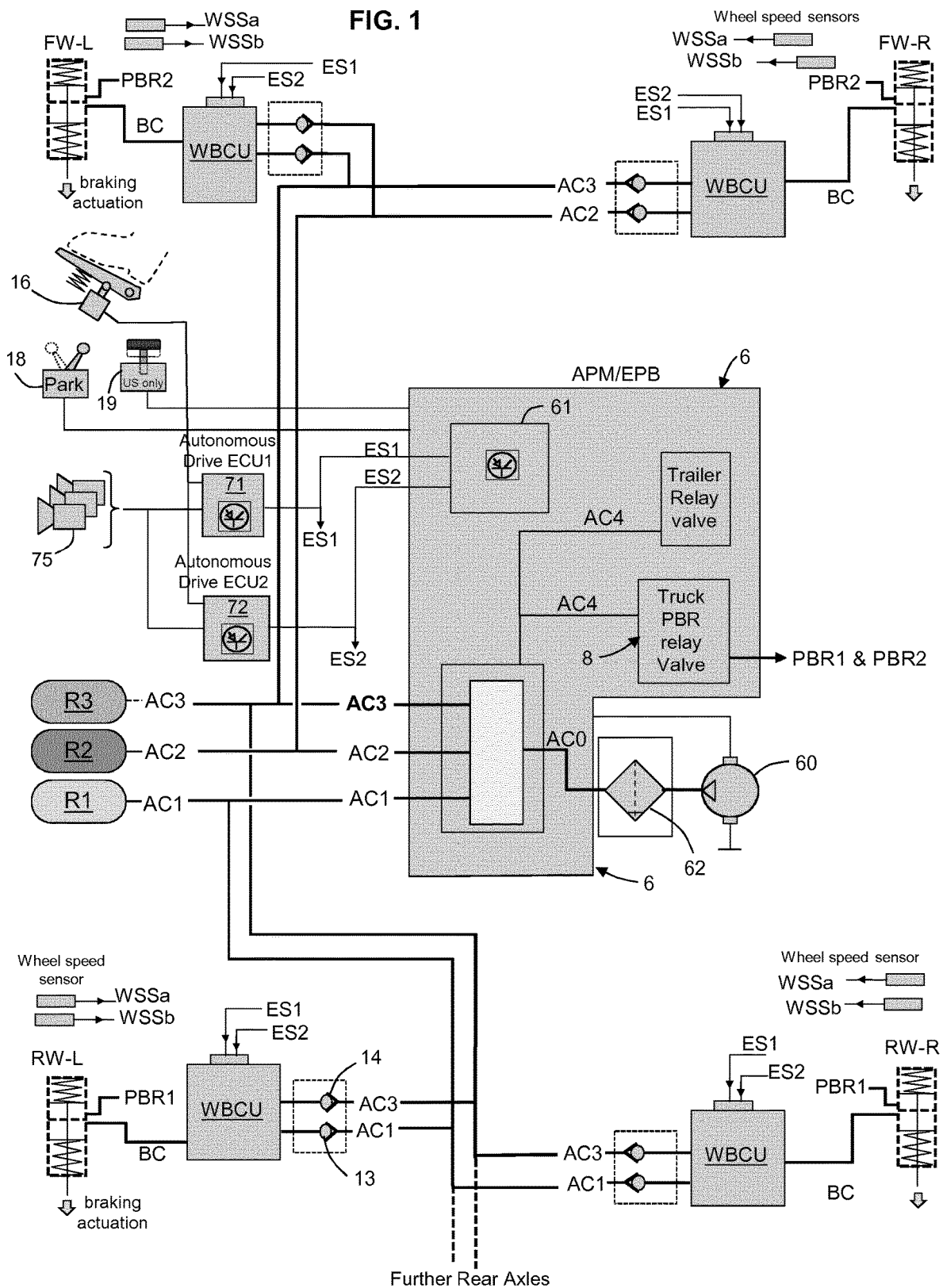
FIG. 1 illustrates a diagrammatical circuit layout of an electro-pneumatic braking system for a truck according to the invention.

FIG. 1 shows a diagrammatical circuit layout of an electro-pneumatic braking system for a truck. The proposed configuration is also valid for any kind of heavy-duty vehicles including buses and coaches.

The truck considered here can be the traction unit in a tractor/trailer configuration or it can be a utility 'carrier' truck.

At least one front axle is a steering axle, without excluding other axle(s) having a steering function including a rear axle.

The truck considered here can have one or more level(s) of autonomous drive functionalities, entailing reinforced needs for redundancy in braking systems.

Overview of the Braking System

For the sake of clarity, the same brake actuator is represented for all wheels, but there may be variations and differences according to the location of the wheel (front, rear, trailer etc. . . . ) As it is known, there are provided brake actuators (RW-L, RW-R, FW-L, FW-R) that can be combined for service brake and park brake actuators as shown at FIG. 1.

Figure 5:
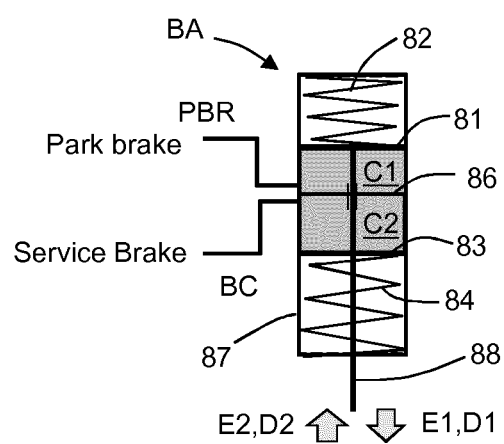
FIG. 5 illustrates a brake pneumatic actuator.

As shown on FIG. 5 each brake actuator (generically referred to as BA) includes a first piston 81 loaded by a first spring 82 which exerts a first effort E1 in a first direction D1. Brake actuator BA also includes a second piston 83 loaded by a second spring 84 which exerts a second effort E2 in a direction D2 opposite to direction D1. Piston 83 is rigid with an output rod 88 of brake actuator which drives an associated brake mechanism (brake pads, disc, etc. not shown). A fixed wall 86 is mounted within a housing 87 of brake actuator. Wall 86 defines, respectively with pistons 81 and 83, two chambers C1, C2 of a variable volume. The rod 88 is coupled to the piston 83, crosses the wall 86 in an air tight manner and is coupled to the piston 81. Springs 82 and 84 are chosen so that effort E1 is larger than effort E2. Thus, in absence of air pressure within chambers C1 and C2, effort E1 pushes piston 81 in direction D1. This effort is transmitted by piston 83 to rod 88 to actuate the associated brake mechanism in a first direction. Under such circumstances, brake mechanism engages the brake disk(s) or drum(s) of the associated rear left wheel or wheels. This corresponds to a park brake actuation for truck. In other words, when no air under pressure is provided to brake actuator BA, the park brake of truck is actuated. Instead of pistons, flexible membranes or diaphragms can be used.

When air under pressure is provided to chamber C1 supplied by input PBR (Parking Brake Release, respectively PBR2 or PBR1 for front and rear), the air pressure within this chamber pushes piston 81 against the action of spring 82 and spring 84 pushes piston 83 in direction D2. This corresponds to the release of the park brake of the truck by releasing the air pressure.

When the park brake has been released and if air under pressure is provided to chamber C2 supplied by input BC (Brake control), the air pressure within chamber C2 pushes piston 83 in direction D1 which progressively actuates brake mechanism in order to brake the corresponding wheel or wheels. The mechanical effort delivered by the actuator to the brake mechanism increases with the air pressure delivered to chamber C2. This corresponds to the actuation of the service brake of truck. The service brake actuator is the device which transforms the air pressure into a mechanical force.

There may be provided more than 4 brake actuators, in case there are two front axles, and/or two or more rear axles. The number of brake actuators can amount to 2, 4, 6, 8, or more. It is worth noting that some brake actuators can be deprived of the parking brake function. The number of brake actuators can be twice the number of axles.

In the illustrated example, each brake actuator is associated with a brake control module, referred to as a wheel brake control unit WBCU, likewise called wheel brake control device.

However, in other configurations, there may be provided one such brake module per twin wheels or one such brake module per axle.

A trailer attached to the truck can also comprise similar wheel brake control devices.

As shown at FIG. 1, there are provided a first air supply circuit AC1 and a second air supply circuit AC2. Further there is provided, in the first illustrated embodiment, a third air supply circuit AC3, forming a redundant air supply to the wheel brake control devices.

There is provided a first air reservoir R1 coupled to the first air supply circuit AC1.

There is provided a second air reservoir R2 coupled to the second air supply circuit AC2.

There is provided a third air reservoir R3 coupled to the third air supply circuit AC3.

Said otherwise, there are provided three air reservoirs (R1, R2, R3 also called 'vessels'), respectively connected to first, second and third air supply circuits (AC1, AC2, AC3), which are designed to be independent from one another. First and second air supply circuits AC1, AC2, have usually a service pressure set around 12 bars. In practice, first and second air supply circuits AC1, AC2, may have a service pressure comprised in the range [5 bars-15 bars], preferably comprised in the range [7 bars-12 bars]. Third, redundant air supply circuit AC3 may have the same service pressure set around 12 bars.

The first air supply circuit AC1 provides air under pressure to the wheel brake control unit WBCU of the rear axle. The second air supply circuit AC2 provides air under pressure the wheel brake control unit WBCU of the front axle. AC1 is sometimes called 'primary' circuit, AC2 is sometimes called 'secondary' circuit, since rear brakes are usually more powerful than front brakes.

The third air supply circuit AC3 provides a redundant air supply both to the wheel brake control unit WBCU of the front and rear axles. In one preferred embodiment, all the three air supply circuits AC1, AC2, AC3 have one same operating pressure.

There is provided an air compressor 60 for compressing air taken from the environment. The output of the compressor goes through a filter/dryer 62. These components are not described in detail here.

There is provided an air production module 6 ('APM' in short), preferably housing components inside a protective enclosure, thereby providing protection against mechanical and fluid attacks. The air production module 6 is located behind the cabin, accessible from one side of the truck for carrier type truck, or accessible from top side if/when the cabin is tilted or rocked. The air production module 6 may comprise various valves, solenoids, relay valves, pressure sensor and a control unit 61.

As known per se, there is provided a parking brake electric input device 18 outputting an electric signal S18, which is delivered to the control unit 61 of the APM 6. There may be provided, with regard to the USA standard, an additional braking handle 19 ('red knob') in relation with the trailer brake control. A corresponding electric signal S19 is delivered to the control unit 61 of the APM 6.

For the air under pressure, coming from the compressor and filter, there is provided a trunk portion AC0. The trunk portion AC0 distributes air through overflow valves (not shown) to the first and second air supply circuits AC1, AC2, and to the third air supply circuit AC3. Additionally, the trunk portion AC0 distributes air through an overflow valve to another air supply circuit denoted AC4 for supplying the truck PBR relay valve 8 and a trailer relay valve.

As shown at FIG. 1, each rear wheel brake control unit WBCU is supplied both by first air supply circuit AC1 and third air supply circuit AC3, redundancy in air supply is handled within the wheel brake control unit WBCU.

In a similar way, each front wheel brake control unit WBCU is supplied both by second air supply circuit AC2 and third air supply circuit AC3, redundancy in air supply is handled within the wheel brake control unit WBCU.

Figure 2:
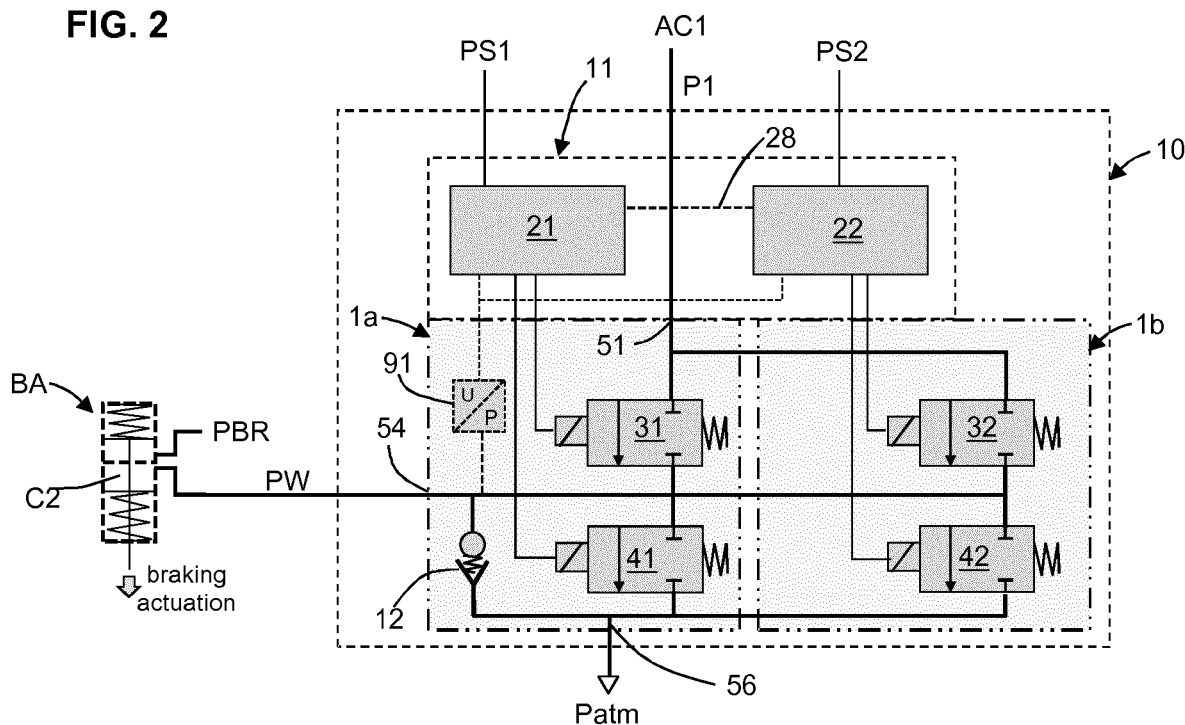
FIG. 2 shows a layout view of the redundant brake module.
Figure 7:
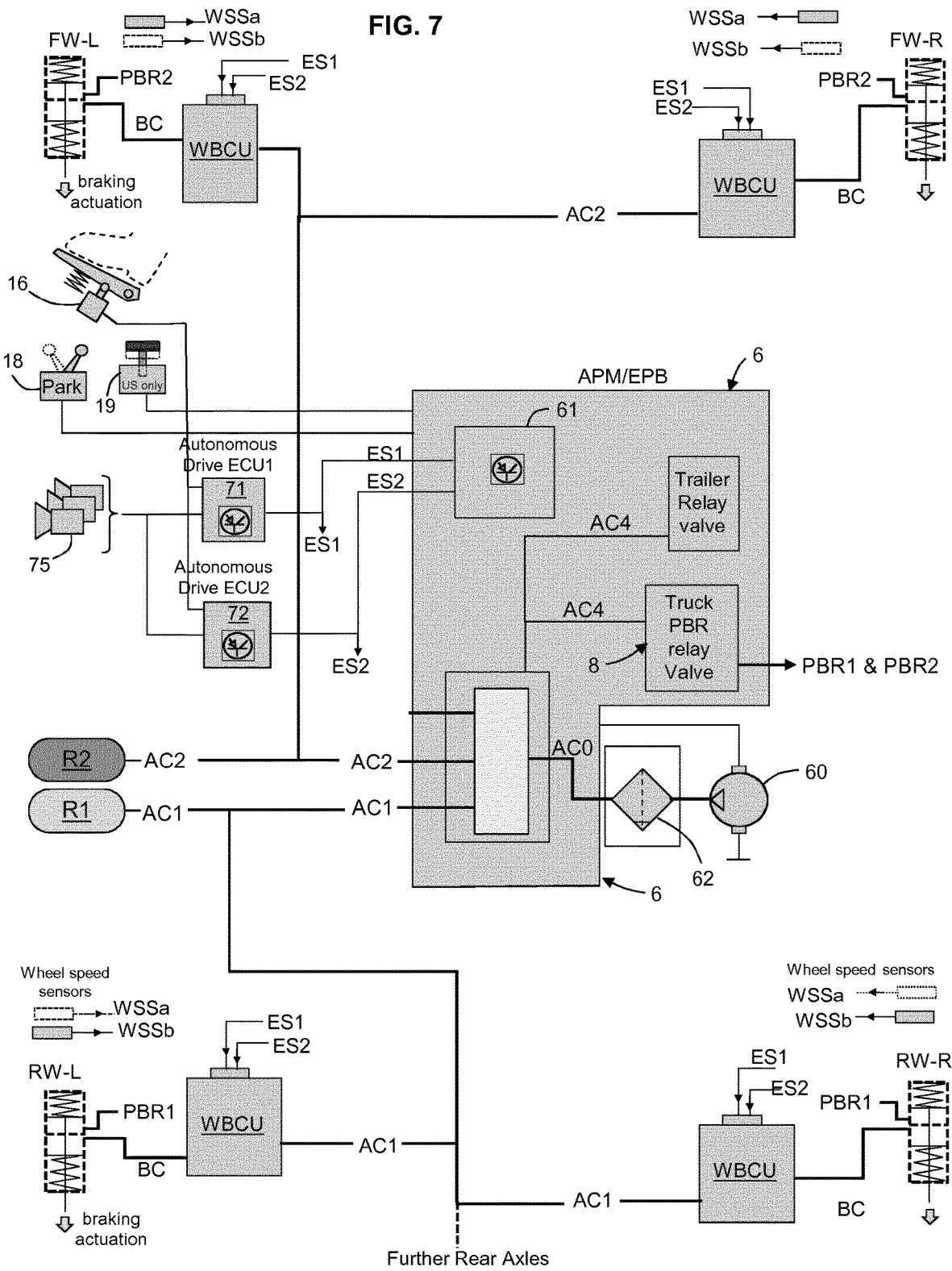
FIG. 7 is similar to FIG. 1 and shows a variant embodiment.

However, as shown at FIG. 7, according to a variant embodiment, the present invention also encompasses a configuration with only two main air supply circuits AC1, AC2, also in accordance with the baseline wheel brake control unit WBCU shown at FIG. 2.

In the overall braking system, there are provided here various vehicle motion electronic control units, namely in the illustrated example autonomous drive ECUs 71, 72.

The brake system comprises a service brake electric input device 16 (formed generally as a brake foot pedal) delivering a first input electric signal S16. The brake system comprises two or more electronic brake control units (71, 72) adapted to process the first input electric signal S16, and to deliver one or more electrical control signals (ES1, ES2) to the front and rear axle brake control units WBCU.

Electrical control signals (ES1, ES2) may be conventional electrical control signals on dedicated lines or messages transported on a databus, like a CAN-bus or a like data bus.

According to one example, electrical control signals delivered by first autonomous drive control unit 71 are denoted ES1, electrical control signals delivered by second autonomous drive control unit 72 are denoted ES2, formed as conventional electrical control signals or formed as equivalent databus messages.

First and second autonomous drive control units 71, 72 rely on cameras 75 which provide a flow of images S75 which are analyzed in autonomous drive control units 71, 72. There may be provided other types of sensors like radars, lidars or the like, and also communication data received from various traffic aware entities (from fixed or mobile entities).

Further, there are provided wheel speed sensors, preferably as illustrated in the first embodiment, two wheel speed sensors (WSSa, WSSb) per braked wheel or pair of twin braked wheels. However, there may be provided a single wheel speed sensors WSS per braked wheel or pair of twin braked wheels.

Wheel Brake Control Device/Unit WBCU

As illustrated at FIG. 2, one baseline embodiment of brake control device 10 comprises a first valve unit 1a and a second valve unit 1b.

The first valve unit 1a comprises:
  one inlet port 51 coupled to a compressed air supply circuit AC1,
  a working port 54 coupled to a service brake chamber C2 of the brake actuator BA,
  one venting port 56 for releasing air to the atmosphere (Patm),
  a first inlet solenoid valve 31 for selectively connecting the inlet port to the working port,
  a first outlet solenoid valve 41 for selectively connecting the working port to the venting port, The second valve unit 1b comprises:
  an inlet port, a working port and a venting port, respectively fluidly connected to the above mentioned inlet port, working port and venting port,
  a second inlet solenoid valve 32 for selectively connecting the inlet port to the working port,
  a second outlet solenoid valve 42 for selectively connecting the working port to the venting port.

The solenoid valves 31, 32, 41, 42 in question are of 2/2 type valves, with two orifices and a plunger having two positions, forming respectively, between the two orifices, an open position and a closed position. The rest position of the plunger corresponds to the closed position, with no substantial passage allowed for air from one orifice to the other orifice. When the electrical coil of the solenoid valve is powered, the plunger moves to the open position allowing air passage from one orifice to the other orifice.

The solenoid valves 31, 32, 41, 42 in question are direct control valves. The inlet and outlet solenoid valves 31, 32, 41, 42 in question are normally closed solenoid valves.

In one of the possible variant embodiments, the two orifices of the first inlet solenoid valve 31 exhibit a size identical to the size of the two orifices of the second inlet solenoid valve 32. Furthermore, the two orifices of the first outlet solenoid valve 41 exhibit a size identical to the size of the two orifices of the second outlet solenoid valve 42.

In this particular configuration, the air flow through each first and second valves is half the total flow, it is a balanced additive flows configuration. In case one air channel becomes unavailable, the control has to be doubled on the remaining one since the total target flow goes through only one valve.

There is provided a biased check valve 12. The biased check valve 12 is arranged to couple the working port 54 to one of the venting port 56.

The biased check valve 12 is for example a spring loaded check valve.

The biased check valve 12 biases the check valve toward an open position, with a biasing force corresponding to a difference (PW−Patm) between working pressure and atmospheric pressure below a predetermined threshold (PTH), chosen between 0 bar and 1 bar, preferably between 0.1 bar and 0.5 bar. If there is one small leak at one of the inlet valve, the biased check valve 12 may prevent undesired actuation of braking. The biased check valve 12 permits elimination of a small air flow from such potential leakage. By contrast, if an intended breakage happens (intended opening of the inlet valve(s)), the working pressure PW rises rapidly and the working pressure PW quickly exceeds the biased check valve predetermined threshold PTH, which remains closed during all the braking sequence. The biased check valve 12 can only re-open if the working pressure PW lowers below the check valve predetermined threshold PTH, after the purge of the service brake chamber C2. This forms a reliable solution that allows purging a small undesirable leak of one inlet valve.

There may be provided a pressure sensor 91. The signals delivered by the pressure sensor is indicative of the working pressure PW prevailing at the working port 54, and prevailing at the service brake chamber C2 of the associated brake actuator BA.

There are provided a first local electronic control unit 21 and a second local electronic control unit 22. The term "local" is to be interpreted as opposed to "remote" for "centralized" which qualify the first and second autonomous drive control units 71, 72.

The first local electronic control unit 21 is configured to perform a real-time regulation of the working pressure according to a setpoint received from a remote unit (through signals/message ES1, ES2 from central unit 71, 72). The first local electronic control unit 21 controls the first inlet solenoid valve 31 and the first outlet solenoid valve 41.

In a similar way, the second local electronic control unit 22 is also configured to perform a real-time regulation of the working pressure according to a setpoint received from a remote unit (through signals/message ES1, ES2 from central unit 71, 72).

The second local electronic control unit 22 controls the second inlet solenoid valve 32 and the second outlet solenoid valve 42.

Therefore, the first and second local electronic control units 21, 22 provide redundant resources to control the associated brake actuator BA.

According to one advantageous aspect, the first and second local electronic control units 21, 22 are supplied from independent electrical power supplies. The first local electronic control unit 21 is supplied by first power supply PS1, and the second local electronic control unit 22 is supplied by first power supply PS2.

It is to be noted that there is provided a redundant, double-channel control. A first channel comprises the first local electronic control unit 21, the first inlet solenoid valve 31, the first outlet solenoid valve 41, and possibly the first power supply PS1 and a first data channel. A second channel comprises the second local electronic control unit 22, the second inlet solenoid valve 32, the second outlet solenoid valve 42 and possibly the second power supply PS2 and a second data channel.

According to one example, the first and second local electronic control unit (21, 22) are caused to control, in a substantially simultaneous fashion, the first and second inlet solenoid valves 31, 32 and to control respectively, in a substantially simultaneous fashion, the first and second outlet solenoid valves 41, 42.

In the case with orifices of identical size, already mentioned above, this simultaneous control gives a parallel balanced additive control (full tandem/symmetrical configuration).

In the case with orifices of different sizes, there may still be a simultaneous control timewise, but with different power cycling to master the respective air flow at each controlled valve.

According to another example, air flow is not excluded in instances including a master unit and a slave unit The master unit is in charge of the actual control and the slave remains in a waiting mode.

The brake control device 10 may further comprise a cross communication link 28 between the first and second local electronic control units 21, 22. Thereby, each first and second local electronic control units can monitor the proper operation of its alter ego, for example by checking the reception of "alive and good health" signals. Further, one of first and second local electronic control units can determine therefrom that its alter ego is not operative, and therefore remain control unit can change accordingly the control law to control the inlet and outlet valves as sole operative valves.

There may be one physical unit enclosing the first inlet solenoid valve 31, the first outlet solenoid valve 41, and the first local electronic control unit 21. There may another physical unit enclosing the second inlet solenoid valve 32, the second outlet solenoid valve 42, and the second local electronic control unit 22. Each of the two physical units forms an integrated mechatronic unit.

However, it is also possible to have a single integrated mechatronic unit combining the four valves, and also possibly the two electronic control units.

The two physical units 1*a*, 1*b* are mechanically independent from one another; they can be located at some distance from one another, increasing thereby independence and redundancy rating.

Figure 3:
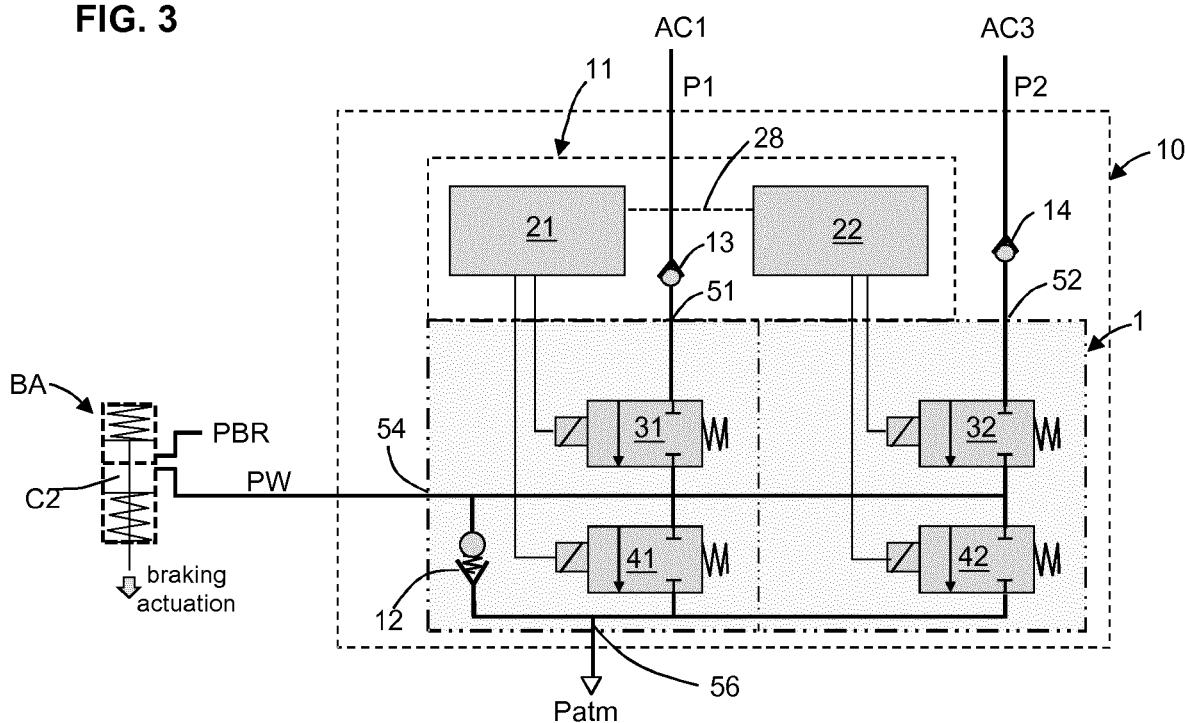
FIG. 3 shows a variant embodiment the redundant brake module.

As illustrated at FIG. 3, unlike a single pneumatic air supply circuit AC1 as in FIG. 2, the brake control device 10 is supplied by two redundant pneumatic air supply circuits AC1 and AC3.

In such configuration, there is provided a first inlet port 51 coupled to a first air supply circuit AC1 and to the first inlet solenoid valve 31 and a second inlet port 52 coupled to a second air supply circuit AC3 and to the second inlet solenoid valve 32.

In such configuration, there is provided a first check valve 13 on the first air supply circuit AC1 upstream the first inlet port 51 and a second check valve 14, on the second air supply circuit AC3 upstream the second inlet port 52. Even when first and second are open simultaneously, a loss of pressure in one of the two circuits does not affect the other circuit which remains fully operative. Also, if one of pneumatic circuit is completely depleted, the service brake chamber C2 of the brake actuator cannot flow back to the depleted circuit.

The first and second check valves 13, 14 can be arranged within the valve assembly 1; according to another possible configuration, first and second check valves 13, 14 can be arranged outside the valve assembly as shown at FIG. 1.

Here the valve assembly forms a single unit 1. The first and second local electronic control units (21, 22) can also be integrated into this single unit, thereby enhancing mechatronics integration. As already noted, the first and second check valves 13, 14 can also be integrated into this single unit 1.

Figure 4:
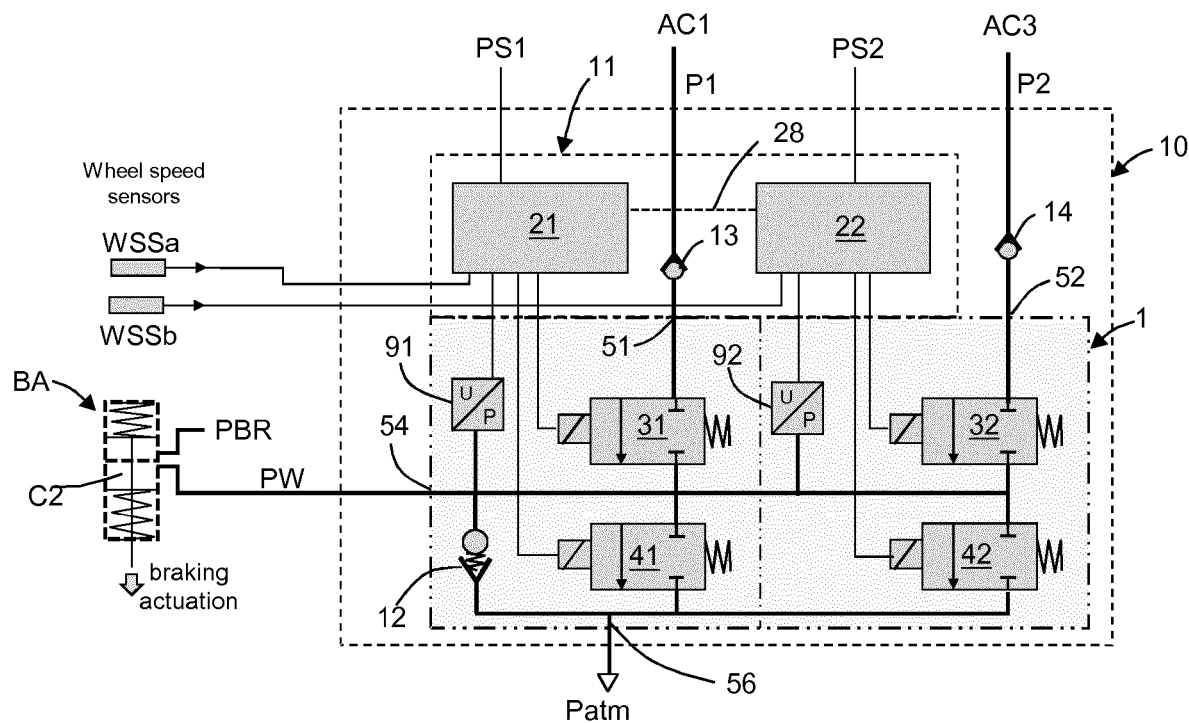
FIG. 4 shows another variant embodiment the redundant brake module.

As illustrated at FIG. 4, the device 10 comprises, in addition to the configuration of FIG. 3, a first pressure sensor 91, and a second pressure sensor 92, a first wheel speed sensor WSSa and a second wheel speed sensor WSSb.

The first pressure sensor 91 is coupled to the first local electronic control unit 21.

The first second pressure sensor 92 is coupled to the second local electronic control unit 22.

The first and second local electronic control units (21, 22) respectively perform a diagnostic routine to monitor proper operation of inlet and outlet valves. For example, each control unit can power during a very short time one valve whereas the 3 other valves are unpowered, and the control unit of interest can monitor the effect of this control on the value given by the pressure sensor. Then the control unit of interest power the other opposite valve whereas the 3 other valves are unpowered, and the control unit of interest can monitor the effect of this control on the value given by the pressure sensor. Thereafter, the other control unit performs a similar double subsequent testing.

We note here that the diagnostic routine can also be carried out with one single pressure sensor 91 fluidly coupled to the working port 54 as illustrated at FIG. 2.

According to another example, the first and second inlet solenoid valves (31, 32) exhibit different pneumatic characteristics and/or first and second outlet solenoid valves (41, 42) exhibit different pneumatic characteristics.

For example, the pneumatic orifice size of one valve can be large and the pneumatic orifice size of the other valve can be smaller. Whereby, coarse and fine pneumatic flow can be combined to result in efficient controllability of the pneumatic flow released to the atmosphere from the working chamber ('controllability' includes actuation time and pressure resolution).

We note here that the pneumatic orifice with the smaller size, for inlet and outlet valves is chosen to be compliant with the minimum regulatory requirements about secondary or backup braking. Therefore, in case the control of the valve with large pneumatic orifice size is lost, the minimal regulatory braking power is still achievable with the remaining channel.

Figure 6:
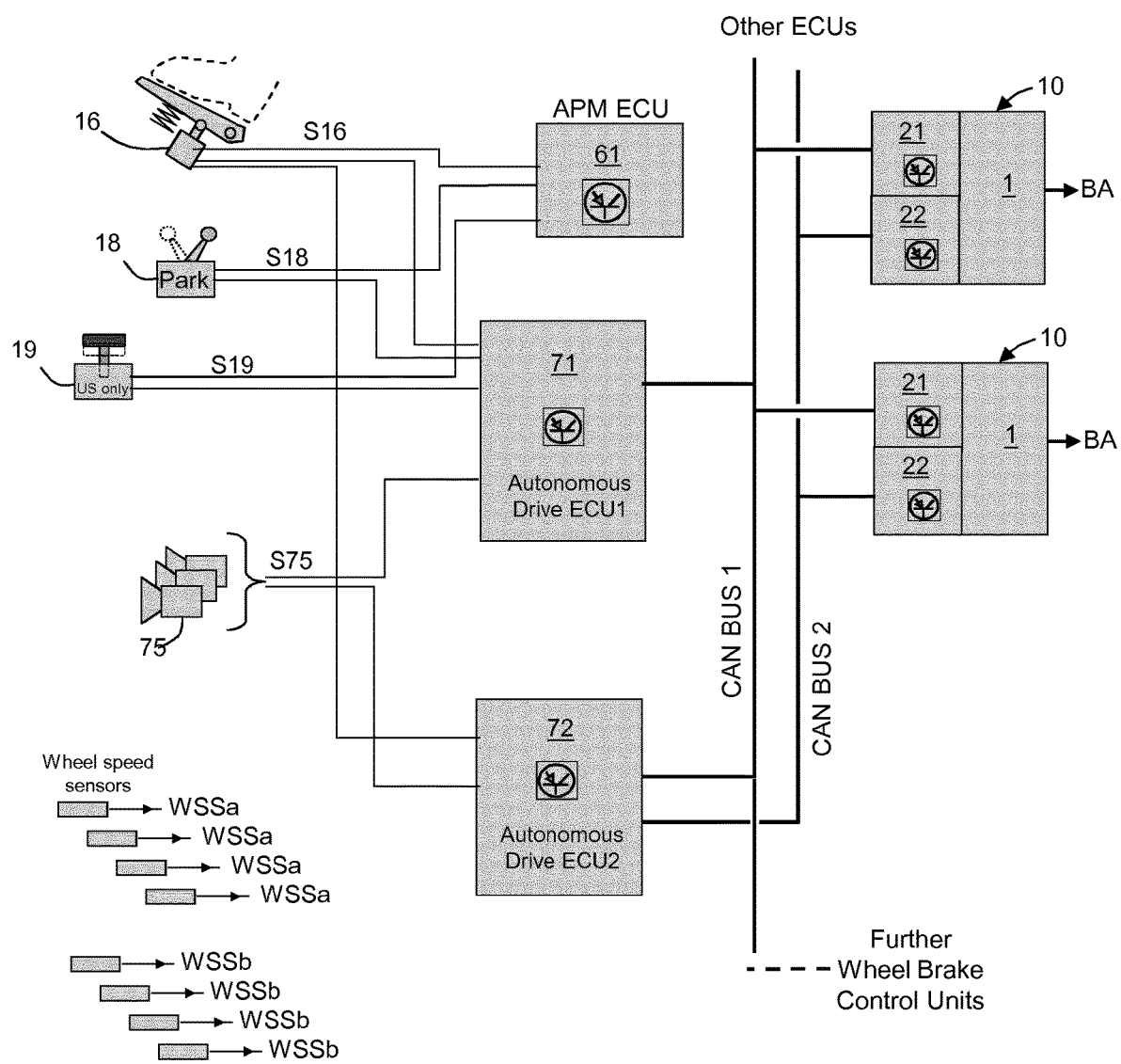
FIG. 6 illustrates an electrical and functional diagram.

As illustrated at FIG. 6, the first electronic autonomous drive unit 71 is coupled to the service brake foot pedal 16, to the cameras 75 and possibly to additional sensors. The first electronic autonomous drive unit 71 receives respective signals S16, S18, S75. Similarly, the second electronic autonomous drive unit 72 is coupled to the service brake foot pedal 16, to the cameras 75 and possibly to additional sensors. The second electronic autonomous drive unit 72 receives respective signals S16, S18, S75, in a redundant arrangement.

Each of first and second electronic autonomous drive units 71, 72 deliver one or more electrical control signals (ES1, ES2) to the front and rear axle brake control devices 10.

The first and second electronic autonomous drive units 71, 72 can also process signals delivered by first and second wheel speed sensors WSSa, WSSb.

ABS function can be handled either locally or in a centralized manner, while a mixed configuration is also possible.

For high-level function like ESP, it is preferred to manage the wheel speed sensors at the centralized units (autonomous drive units 71, 72). Brake action on one wheel can be decided in a centralized manner and then executed locally at the relevant wheel.

Depending on the expectation on real-time requirements, the basic low level ABS routines can be handled locally at the first and second local electronic control units 21, 22.

The first and second local electronic control units 21, 22 are provided with data from two independent data channels for controlling locally the braking function, here CAN BUS 1 and CAN BUS 2. Having more than two channels is also considered.

In one example, there is provided two independent communication data buses. According to another example, there may be provided two independent conventional electrical control signals (wireline solution).

Thereby, redundancy is achieved regarding data to control the wheel brake control devices; if one data channel fails rendering its associated ECU inoperative, the other ECU can still be supplied by the other data channel and remains operative.

As shown at FIG. 7, in a variant embodiment, there is provided redundancy on the electrical controls as explained above, however the pneumatic circuits remain conventional, i.e. a primary circuit AC1 for supplying rear brakes, and a secondary circuit AC2 for supplying front brakes.

Miscellaneous

The inlet and outlet solenoid valves (31, 32, 41, 42) are normally closed solenoid valves. In the case when one of the ECUs 21, 22 happen to be unavailable or is unpowered, the corresponding valves (inlet and outlet) remain closed (or move to the closed position), and the operation of the remaining ECU and its associated valves is not hindered by the part of the circuit which is inoperative.

More precisely, a problem affecting the first control channel does not hinder the proper operation of the second control channel since first valves 31 and 41 will remain closed, while second valves 32 and 42 can operate properly. Conversely, if a problem affects the second control channel, second valves 32 and 42 will remain closed (or move to the closed position) while first valves 31 and 41 can operate properly.

The pneumatic brake system mentioned above constitutes the main service brake system of the vehicle which is used to slow down and to stop the vehicle during normal operation, whatever the speed of the vehicle. Besides, the park brake system is used mainly to maintain the vehicle stopped when it is not in use. The park brake system can be least partly combined with the service brake system, nevertheless, a park brake system can be independent of the service brake system, it can for example comprise a system for blocking the vehicle transmission.

Heavy-duty vehicles, such as trucks and buses, are also often equipped with a deceleration system (likewise called 'retarder'), which is only capable of slowing down a vehicle, but often not capable of effectively stopping the vehicle completely within a reasonable distance. Such deceleration systems, such as hydro-dynamic brakes or electro-dynamic brakes, are mostly efficient when the vehicle is riding above a certain speed. Such deceleration systems are by essence different from the pneumatic brake system described above.

The invention claimed is:

1. A brake control device for delivering air under controlled pressure to a pneumatic brake actuator, with a valve assembly comprising:
    at least one inlet port coupled to at least a compressed air supply circuit;
    a working port coupled to a service brake chamber of the brake actuator;
    at least one venting port for releasing air to the atmosphere;
    a first inlet solenoid valve for connecting one or more inlet ports to the working port, upon selective control;
    a first outlet solenoid valve for connecting the working port to one or more venting ports, upon selective control;
    a second inlet solenoid valve for connecting one or more inlet ports to the working port, upon selective control;
    a second outlet solenoid valve for connecting the working port to one or more venting ports, upon selective control; and
    a biased check valve, for coupling the working port to one or more venting ports, the brake control device further comprising:
        a first local electronic control unit for controlling the first inlet solenoid valve and the first outlet solenoid valve; and
        a second local electronic control unit for controlling the second inlet solenoid valve and the second outlet solenoid valve.

2. The brake control device of claim 1, wherein the first and second local electronic control units are caused to control, in a substantially simultaneous fashion, the first and second inlet solenoid valves and to control respectively, substantially simultaneously, the first and second outlet solenoid valves.

3. The brake control device of claim 1, wherein the first and second inlet solenoid valves exhibit different pneumatic characteristics and/or the first and second outlet solenoid valves exhibit different pneumatic characteristics.

4. The brake control device of claim 1, wherein the inlet and outlet solenoid valves are normally closed solenoid valves.

5. The brake control device of claim 1, wherein the first and second local electronic control units are supplied from independent electrical power supplies.

6. The brake control device of claim 1, wherein the first and second local electronic control units comprise data from at least two independent communication buses or from at least two independent control signals.

7. The brake control device of claim 1 further comprising a first inlet port coupled to a first air supply circuit and to the first inlet solenoid valve and a second inlet port coupled to a second air supply circuit and to the second inlet solenoid valve.

8. The brake control device of claim 1, further comprising first and second pressure sensors, wherein the first and second local electronic control units can respectively perform a diagnostic routine to monitor proper operation of the inlet and outlet valves.

9. The brake control device of claim 1, further comprising wheel speed sensors per braked wheel or pair of twin braked wheels.

10. The brake control device of claim 1 further comprising a cross communication link between the first and second local electronic control units.

11. The brake control device of claim 1, wherein the valve assembly is a single unit.

12. The brake control device of claim 1, wherein the valve assembly comprises two separate units, each with or without its associated local electronic control unit integrated therein.

13. The brake control device of claim 1, wherein the biased check valve biases the check valve toward an open position, with a biasing force corresponding to a difference between working pressure and atmospheric pressure below a predetermined threshold, chosen between 0 bar and 1 bar.

14. An electronically controlled pneumatic brake system for an automotive vehicle comprising one or more brake control device(s) delivering air under controlled pressure to a pneumatic brake actuator, with a valve assembly comprising:
- at least one inlet port coupled to at least a compressed air supply circuit;
- a working port coupled to a service brake chamber of the brake actuator;
- at least one venting port for releasing air to the atmosphere;
- a first inlet solenoid valve for connecting one or more inlet ports to the working port, upon selective control;
- a first outlet solenoid valve for connecting the working port to one or more venting ports, upon selective control;
- a second inlet solenoid valve for connecting one or more inlet ports to the working port, upon selective control;
- a second outlet solenoid valve for connecting the working port to one or more venting ports, upon selective control; and
- a biased check valve, for coupling the working port to one or more venting ports, the brake control device further comprising:
  - a first local electronic control unit for controlling the first inlet solenoid valve and the first outlet solenoid valve; and
  - a second local electronic control unit for controlling the second inlet solenoid valve and the second outlet solenoid valve.

15. A vehicle comprising an electronically controlled pneumatic brake system comprising one or more brake control device(s) delivering air under controlled pressure to a pneumatic brake actuator, with a valve assembly comprising:
- at least one inlet port coupled to at least a compressed air supply circuit;
- a working port coupled to a service brake chamber of the brake actuator;
- at least one venting port for releasing air to the atmosphere;
- a first inlet solenoid valve for connecting one or more inlet ports to the working port, upon selective control;
- a first outlet solenoid valve for connecting the working port to one or more venting ports, upon selective control;
- a second inlet solenoid valve for connecting one or more inlet ports to the working port, upon selective control;
- a second outlet solenoid valve for connecting the working port to one or more venting ports, upon selective control; and
- a biased check valve, for coupling the working port to one or more venting ports, the brake control device further comprising:
  - a first local electronic control unit for controlling the first inlet solenoid valve and the first outlet solenoid valve; and
  - a second local electronic control unit for controlling the second inlet solenoid valve and the second outlet solenoid valve.

* * * * *